(12) United States Patent
Choi (10) Patent No.: US 12,434,698 B2
(45) Date of Patent: Oct. 7, 2025

(54) VEHICLE DRIVING CONTROL SYSTEM AND METHOD

(71) Applicant: HYUNDAI MOBIS CO., LTD., Seoul (KR)

(72) Inventor: Kwang Il Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 415 days.

(21) Appl. No.: 17/522,186

(22) Filed: Nov. 9, 2021

(65) Prior Publication Data

US 2022/0203982 A1  Jun. 30, 2022

(30) Foreign Application Priority Data

Dec. 28, 2020  (KR) .................. 10-2020-0184813

(51) Int. Cl.
*B60W 30/16* (2020.01)
*B60W 30/14* (2006.01)
(Continued)

(52) U.S. Cl.
CPC .......... *B60W 30/16* (2013.01); *B60W 30/143* (2013.01); *B60W 40/04* (2013.01); *B60W 50/14* (2013.01); *G06V 20/584* (2022.01); *G06V 20/588* (2022.01); *B60W 2050/143* (2013.01); *B60W 2552/53* (2020.02); *B60W 2554/4041* (2020.02); *B60W 2554/4042* (2020.02);
(Continued)

(58) Field of Classification Search
CPC .... B60W 50/14; B60W 30/16; B60W 30/143; B60W 40/04; B60W 2050/143; B60W 2552/53; B60W 2554/4042; B60W 2554/4045; B60W 2554/802; B60W 2420/42; B60W 2420/52; B60W 40/02; B60W 40/10; B60W 2554/4043; G06V 20/584; G06V 20/588; G06V 20/58

See application file for complete search history.

(56) References Cited

U.S. PATENT DOCUMENTS

| | | | |
|---|---|---|---|
| 2015/0291216 A1* | 10/2015 | Sato ................. | B60W 30/0956 701/41 |
| 2019/0266421 A1* | 8/2019 | Kim ..................... | H04N 7/188 |
| 2022/0089164 A1* | 3/2022 | Wang ............. | B60W 30/18163 |

FOREIGN PATENT DOCUMENTS

KR  10-2054926 B1  12/2019

OTHER PUBLICATIONS

U.S. patent and trademark office releases hyundai motor and KIA motors's patent application for ECU, autonomous vehicle including ECU and method of controlling lane change for the same. (Jan. 3, 2019). Global IP News.Automobile Patent News Retrieved from https://dialog.proquest.com/professional/docview/2162975904?.*

(Continued)

*Primary Examiner* — Christian Chace
*Assistant Examiner* — Katherine Marie Fitzharris
(74) *Attorney, Agent, or Firm* — NSIP Law (57) ABSTRACT

A vehicle driving control system including a vehicle detector to detect a target vehicle and calculate position information and movement information on the target vehicle, a lane detector to recognize a lane in which a subject vehicle is traveling and to calculate lane information on the lane, and a determiner to determine cut-in or cut-out of the target vehicle based on relative movement between the subject vehicle and the target vehicle in a horizontal direction or change in a length of the lane.

13 Claims, 3 Drawing Sheets

(51) Int. Cl.
*B60W 40/04* (2006.01)
*B60W 50/14* (2020.01)
*G06V 20/56* (2022.01)
*G06V 20/58* (2022.01)

(52) U.S. Cl.
CPC .............. *B60W 2554/4045* (2020.02); *B60W 2554/802* (2020.02)

(56) References Cited

OTHER PUBLICATIONS

Khelfa, Basma & Tordeux, Antoine. (2020). Extended Longitudinal Motion Planning for Autonomous Vehicles on Highways Including Lane Changing Prediction. 10.1007/978-3-030-55973-1_61. (Year: 2020).*

* cited by examiner

FIG. 3

VEHICLE DRIVING CONTROL SYSTEM AND METHOD

CROSS-REFERENCE TO RELATED APPLICATION

This application claims the priority of Korean Patent Application No. 10-2020-0184813, filed on Dec. 28, 2020 in the Korean Intellectual Property Office, the disclosure of which is incorporated herein by reference.

BACKGROUND OF THE INVENTION

1. Field of the Invention

The present invention relates to a vehicle driving control system and method, and more specifically, to a technology for determining cut-in or cut-out of a target vehicle and controlling driving of a vehicle on the basis of the determination result.

2. Description of the Related Art

With the development of the automobile industry, sensors and systems for obtaining various types of information such as positions, speeds, turn angles, lengths, and widths of neighboring vehicles are consistently developed in order to provide driver convenience. For example, a vehicle can obtain information on neighboring vehicles using various sensors such as a front radar, a corner radar, vision, and lidar sensors. A vehicle can determine whether a neighboring vehicle intends to cut in in front of the vehicle using sensors and artificial intelligence technology and provide various functions such as a function of avoiding collision with a neighboring vehicle to a driver on the basis of the determination result.

When a vehicle travels on a road according to a self-driving system, movement of a target vehicle to the front of the vehicle, that is, cut-in, or movement of the target vehicle from the front of the vehicle to a side of the vehicle, that is, cut-out, may occur.

Conventionally, cut-in or cut-out of a vehicle is determined by detecting lateral movement of the vehicle, but when a target vehicle is traveling while moving to the side without exiting the lane, cut-in or cut-out of the target vehicle may be erroneously determined.

It will be understood that the above matters described in the related art are merely for promotion of understanding of the background of the invention and should not be recognized as prior art well-known to those skilled in the art.

SUMMARY OF THE INVENTION

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a vehicle driving control system includes a vehicle detector to detect a target vehicle and to calculate position information and movement information on the target vehicle, a lane detector to recognize a lane in which a subject vehicle is traveling and to calculate lane information on the lane, and a determiner to determine cut-in or cut-out of the target vehicle based on relative movement between the subject vehicle and the target vehicle in a horizontal direction or change in a length of the lane.

The vehicle detector may be connected to a camera sensor or a radar sensor disposed in the subject vehicle to calculate the movement information on the target vehicle in the horizontal direction.

The determiner may determine cut-in or cut-out of the target vehicle by comparing a maximum length and a minimum length of the lane in which the subject vehicle is traveling detected by the lane detector and determining a similarity between a distance in a vertical direction between the subject vehicle and the target vehicle detected by the vehicle detector and the minimum length of the lane detected by the lane detector.

The determiner may determine the similarity between the distance in the vertical direction between the subject vehicle and the target vehicle and the minimum length of the lane by comparing a tuning value, obtained by dividing a difference between the distance in the vertical direction between the subject vehicle and the target vehicle and the minimum length of the lane by a larger value between the distance in the vertical direction between the subject vehicle and the target vehicle and the minimum length of the lane, with a predetermined value.

The determiner may calculate a difference between the maximum length and the minimum length of the lane in which the subject vehicle is traveling detected by the lane detector and determine cut-in or cut-out of the target vehicle in a case in which the calculated difference exceeds a predetermined value.

The lane detector may be connected to a camera sensor disposed in the subject vehicle to detect the lane in which the subject vehicle is traveling.

The determiner may determine cut-in or cut-out of the target vehicle based on a position and a speed of the target vehicle in the horizontal direction detected by the vehicle detector.

The vehicle driving control system may further include a warning generator to generate a warning signal or warning sound upon determination of cut-in or cut-out of the target vehicle by the determiner.

The vehicle driving control system may further include a controller to control driving of the subject vehicle based on the position information and the movement information on the target vehicle detected by the vehicle detector upon determination of cut-in or cut-out of the target vehicle by the determiner.

In another general aspect, a vehicle driving control method includes detecting a target vehicle and calculating position information and movement information on the target vehicle, recognizing a lane in which a subject vehicle is traveling and calculating lane information on the lane, and determining cut-in or cut-out of the target vehicle with respect to the lane based on relative movement of the subject vehicle and the target vehicle in a horizontal direction or change in a length of the lane.

The vehicle driving control method may include determining a similarity between a distance in a vertical direction between the subject vehicle and the target vehicle and a minimum length of the lane, wherein cut-in or cut-out of the target vehicle may be determined by comparing a maximum length and the minimum length of the lane upon determination that the distance in the vertical direction between the subject vehicle and the target vehicle is similar to the minimum length of the lane.

Cut-in or cut-out of the target vehicle may be determined based on a position and a speed of the target vehicle in the horizontal direction.

The vehicle driving control method may include generating a warning signal or warning sound upon determination of cut-in or cut-out of the target vehicle.

The vehicle driving control method may include controlling driving of the subject vehicle based on the position information and the movement information on the target vehicle upon determination of cut-in or cut-out of the target vehicle.

Other features and aspects will be apparent from the following detailed description, the drawings, and the claims.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Specific structural and functional descriptions of embodiments of the present invention disclosed in the present specification or application are illustrated for the purpose of describing embodiments according to the present invention, and embodiments according to the present invention may be implemented in various forms and should not be construed as being limited to the embodiments described in the present specification and application.

While embodiments according to the present invention are susceptible to various modifications and alternative forms, specific embodiments are shown by way of example in the drawings. However, the present invention should not be construed as limited to the embodiments set forth herein, but on the contrary, the present invention is to cover all modifications, equivalents, and alternatives falling within the spirit and scope of the present invention.

The terms "first" and/or "second" are used to describe various components, but such components are not limited by these terms. The terms are used to discriminate one component from another component. For example, a first component may be called a second component and the second component may be called the first component within the technical spirit of the present invention.

When a component is "coupled" or "connected" to another component, it should be understood that a third component may be present between the two components although the component may be directly coupled or connected to the other component. When a component is "directly coupled" or "directly connected" to another component, it should be understood that no element is present between the two components. Further, other representations describing a relationship between components, that is, "between", "immediately between", "adjacent to" and "directly adjacent to" should be construed likewise.

The terms used in the specification of the present invention are merely used in order to describe particular embodiments, and are not intended to limit the scope of the present invention. An element described in the singular form is intended to include a plurality of elements unless the context clearly indicates otherwise. In the specification of the present invention, it will be further understood that the term "comprise" or "include" specifies the presence of a stated feature, figure, step, operation, component, part or a combination thereof, but does not preclude the presence or addition of one or more other features, figures, steps, operations, components, or combinations thereof.

All the terms that are technical, scientific or otherwise agree with the meanings as understood by a person skilled in the art unless defined to the contrary. Common terms as found in dictionaries should be interpreted in the context of the related technical writings not too ideally or impractically unless expressly disclosed herein.

Hereinafter, preferred embodiments of the present invention will be described in detail with reference to the attached drawings. Throughout the drawings, the same reference numerals represent the same members.

Figure 1:
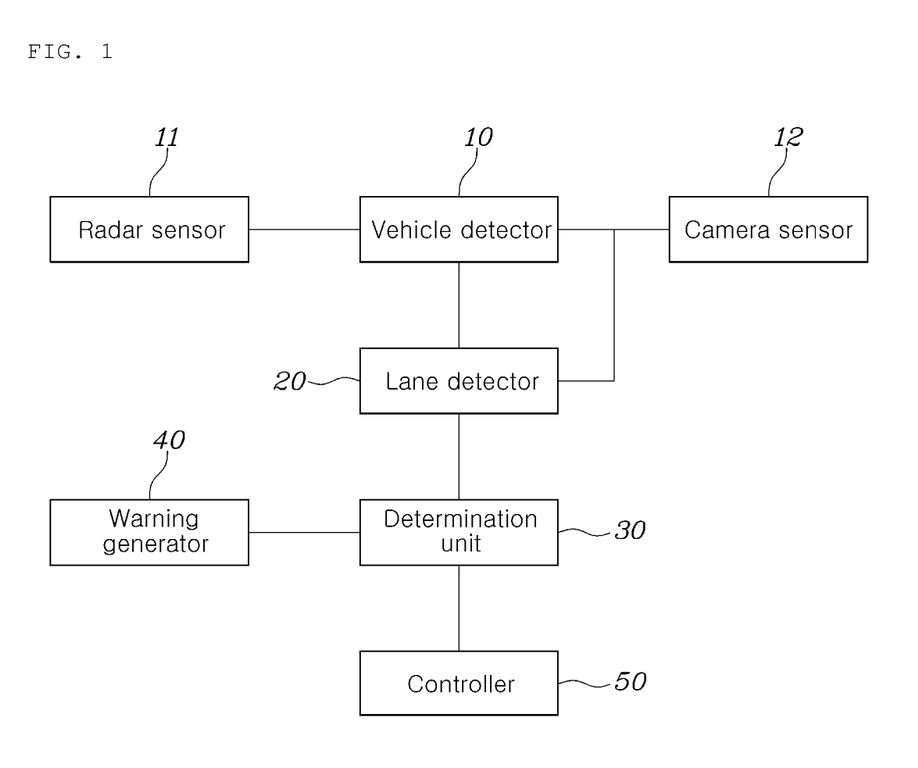
FIG. 1 is a block diagram of a vehicle driving control system according to an embodiment of the present invention.

A vehicle detector 10, a lane detector 20, a determination unit 30, a warning generator 40, and a controller 50 according to an exemplary embodiment of the present invention may be realized using a nonvolatile memory (not shown) configured to store an algorithm configured to control operations of various components of a vehicle 100 or data with respect to software commands for executing the algorithm, and a processor (not shown) configured to perform operations which will be described below using data stored in the memory. Here, the memory and the processor may be realized as individual chips. Alternatively, the memory and the processor may be realized as a single integrated circuit. The processor may be configured as one or more processors.

Figure 2:
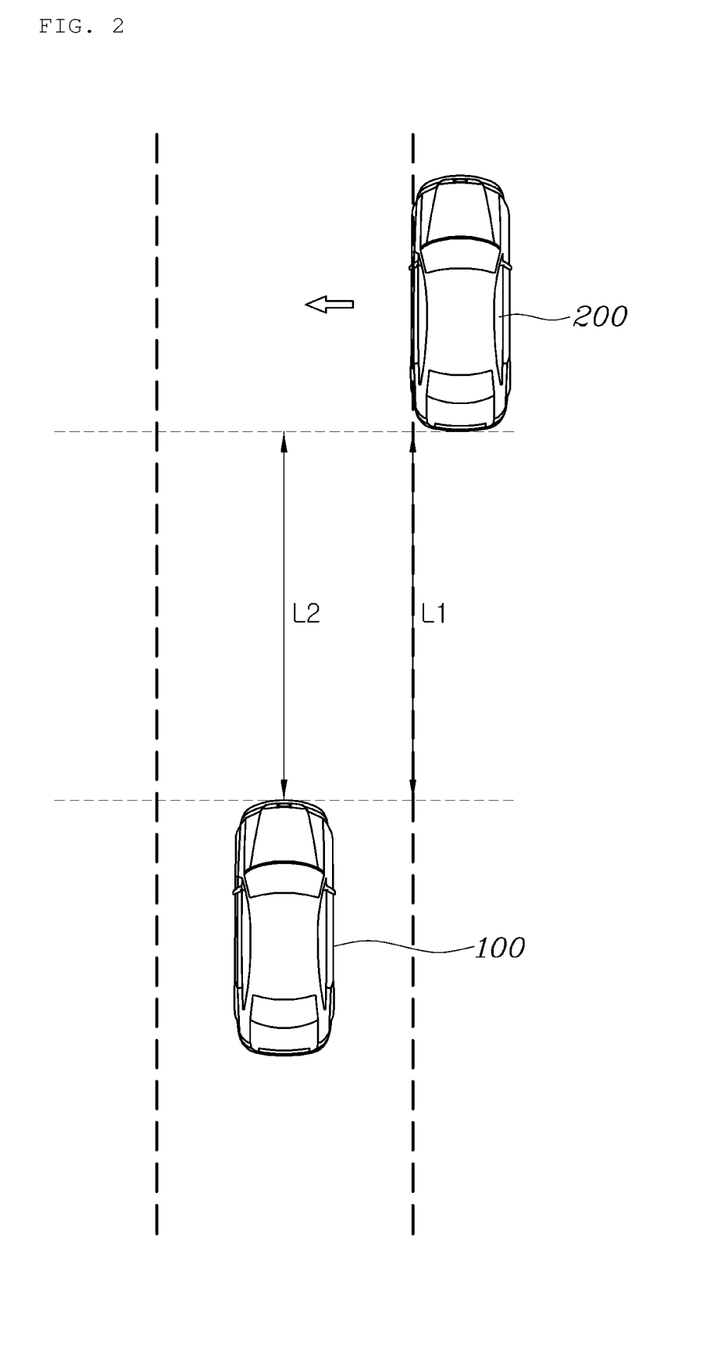
FIG. 2 illustrates movement of a neighboring vehicle into a lane in which a vehicle is traveling.

FIG. 1 is a block diagram of a system for controlling the vehicle 100 according to an embodiment of the present invention and FIG. 2 illustrates movement of a neighboring vehicle 200 (e.g., a target vehicle) into a lane in which the vehicle 100 is traveling.

Although FIG. 2 illustrates cut-in of the neighboring vehicle 200 (i.e., the target vehicle), cut-out may also be detected in the same manner according to the configuration of the present invention.

A preferred embodiment of the system for controlling the vehicle 100 according to the present invention will be described with reference to FIG. 1 and FIG. 2.

The system for controlling driving of the vehicle 100 according to the present invention may detect a neighboring vehicle located adjacent to the vehicle 100 in front of the vehicle 100 as a target vehicle 200 and detect a situation in which the target vehicle 200 is moving into the front of the vehicle 100 (cut-in) or the target vehicle 200 located in front of the vehicle 100 is getting out of the lane in which the vehicle 100 is traveling (cut-out) to assist self-driving of the vehicle 100 or driving of a driver.

In the present invention, cut-in means movement of the target vehicle 200 into a lane in which the vehicle 100 is traveling in front of the vehicle 100 and cut-out means movement of the target vehicle 200 in front of the vehicle 100 to the side to exit the lane.

The system for controlling driving of the vehicle 100 according to the present invention includes the vehicle detector 10 that detects the target vehicle 200 and calculates position information or movement information on the target vehicle 200, a lane detector 20 that recognizes a lane in which the vehicle 100 is traveling and calculates lane information on the lane, and a determination unit 30 that determines cut-in or cut-out of the target vehicle 200 with respect to the lane in which the vehicle 100 is traveling on the basis of relative movement of the vehicle 100 and the target vehicle 200 in the horizontal direction or change in a length of the recognized lane.

The vehicle detector 10 may detect the target vehicle 200 traveling adjacent to the vehicle 100, detect relative positions of the vehicle 100 and the target vehicle 200 in the vertical direction and the horizontal direction, and detect relative speeds of the target vehicle 200 in the vertical direction and the horizontal direction on the basis of the relative positions. The vertical direction refers to up and down movement and the horizontal direction refers to lateral movement, as illustrated in FIG. 2.

The lane detector 20 may detect a lane in which the vehicle 100 is traveling, detect the length and the width of the lane to ascertain a distance between the detected lane and the center of the vehicle 100, and assist driving of the driver such that the vehicle 100 is traveling at the center of the lane. The lane in which the vehicle 100 is traveling may be discontinuously detected due to external obstacles, or the lengths of both sides of the lane may be detected as different lengths.

The determination unit 30 may determine cut-in or cut-out of the vehicle 100 on the basis of position information or movement information on the target vehicle 200 in the horizontal direction detected by the vehicle detector 10 or determine cut-in or cut-out of the target vehicle 200 on the basis of discontinuity of the lane and a distance in the vertical direction between the target vehicle 200 and the vehicle 100 detected by the lane detector 20.

Accordingly, it is possible to correctly determine a cut-in or cut-out state of the target vehicle 200 moving in the horizontal direction in front of the vehicle 100 through the aforementioned various types of information.

The vehicle detector 10 may be connected to a camera sensor 12 or a radar sensor 11 provided in the vehicle 100 to calculate horizontal movement information of the target vehicle 200.

A plurality of camera sensors 12 may be provided in the vehicle 100 and capture a front view image, a side view image, and a rear view image of the vehicle 100 to detect the target vehicle 100, and the radar sensor 11 provided in the vehicle 100 may calculate position information and movement information on the target vehicle 200 located adjacent to the vehicle 100 by transmitting electromagnetic waves to the target vehicle 200 and receiving electromagnetic waves reflected therefrom.

The determination unit 30 may compare a maximum length and a minimum length of the lane in which the vehicle 100 is traveling, detected by the lane detector 20, and determine a similarity between a distance L2 in the vertical direction between the vehicle 100 and the target vehicle 200 detected by the vehicle detector 10 and the minimum length L1 of the lane detected by the lane detector 20 to determine cut-in or cut-out.

As illustrated in FIG. 2, when the target vehicle 200 moves into the lane in which the vehicle 100 is traveling, the lane detector 20 detects that the lengths of both sides of the lane in which the vehicle 100 is traveling are different from each other because the lane is covered by the target vehicle 200, and when a difference between the maximum length and the minimum length of the lane exceeds a predetermined value, the vehicle detector 10 may detect the distance L2 in the vertical direction between the vehicle 100 and the target vehicle 200 and the determination unit 30 may determine a similarity between the distance L2 in the vertical direction between the vehicle 100 and the target vehicle 200 and the minimum length L1 of the lane to determine cut-in or cut-out of the target vehicle 200.

The determination unit 30 may determine the similarity between the distance L2 in the vertical direction between the vehicle 100 and the target vehicle 200 and the minimum length L1 of the lane by comparing a tuning value obtained by dividing the difference between the distance L2 in the vertical direction between the vehicle 100 and the target vehicle 200 and the minimum length L1 of the lane by a larger value between the distance L2 and the minimum length L1 with a predetermined value.

In determination of the similarity between the distance L2 in the vertical direction between the vehicle 100 and the target vehicle 200 and the minimum length L1 of the lane, the tuning value may be calculated through the following formula to determine the similarity between the distance L2 in the vertical direction between the vehicle 100 and the target vehicle 200 and the minimum length L1 of the lane.

$$|(\text{Vertical distance } L2 - \text{minimum length } L1 \text{ of lane})|/\text{large}(\text{vertical distance } L2, \text{ minimum length } L1 \text{ of lane}) = \text{tuning value}$$

The tuning value is calculated by dividing an absolute value of the difference between the distance L2 in the vertical direction between the vehicle 100 and the target vehicle 200 and the minimum length L1 of the lane by a larger value between the distance L2 and the minimum length L1 through the above formula. The tuning value may be calculated as a value in the range of 0 to 1, and it is determined that the distance L2 in the vertical direction between the vehicle 100 and the target vehicle 200 is more similar to the minimum length L1 of the lane as the tuning value is closer to 0.

The determination unit 30 may calculate a difference between the maximum length and the minimum length of the lane in which the vehicle 100 is traveling, detected by the lane detector 20, and determine cut-in or cut-out of the target vehicle 200 when the calculated difference exceeds a predetermined value.

The determination unit 30 compares the maximum length and the minimum length of the lane in which the vehicle 100 is traveling, detected by the lane detector 20, before calculation of the tuning value. Here, the determination unit 30 may calculate the tuning value when a value obtained by subtracting the minimum length of the lane from the maximum length of the lane is a predetermined value or more and the value is maintained for a predetermined time.

In this manner, a cut-in or cut-out state of the target vehicle 200 can be correctly detected.

The lane detector 20 may be connected to the camera sensor 12 provided in the vehicle 100 to detect the lane in which the vehicle 100 is traveling.

The lane detector 20 may be connected to the camera sensor 12 provided at the front, side or rear of the vehicle 100 and may detect the lane in which the vehicle 100 is traveling on the basis of image information captured by the camera sensor 12.

The determination unit 30 may determine cut-in or cut-out of the target vehicle 200 on the basis of a position and a speed of the target vehicle 200 in the horizontal direction detected by the vehicle detector 10.

Separately from a logic that determines cut-in or cut-out of the target vehicle 100 based on the tuning value, the determination unit 30 of the vehicle 100 may determine cut-in or cut-out of the target vehicle 200 when position information and movement information regarding change in the position of the target vehicle 200 in the horizontal direction in front of the vehicle 100 have been calculated by the vehicle detector 10.

Accordingly, cut-in or cut-out of the target vehicle 200 can be determined through a plurality of determination methods.

The system for controlling driving of the vehicle 100 may further include the warning generator 40 that generates a warning signal or warning sound upon determination of cut-in or cut-out of the target vehicle 200 by the determination unit 300.

The warning generator 40 may generate a warning on the basis of the speed of the vehicle 100 to assist driving of the driver upon determination of cut-in or cut-out of the target vehicle 200 in front of the vehicle 100 by the determination unit 30.

The system for controlling driving of the vehicle 100 may further include the controller 50 that controls driving of the vehicle 100 on the basis of position information and movement information on the target vehicle 200 detected by the vehicle detector 10 upon determination of cut-in or cut-out of the target vehicle 200 by the determination unit 30.

In control of self-driving of the vehicle 100, the controller 50 may control the speed of the vehicle 100 upon determination of cut-in or cut-out of the target vehicle 200 by the determination unit 30.

The controller 50 can reduce the speed of the vehicle 100 on the basis of a relative distance between the target vehicle 200 and the vehicle 100 at the time of cut-in of the target vehicle 200 and increase the speed of the vehicle 100 at the time of cut-out of the target vehicle 200 to speed up the flow of traffic.

Figure 3:
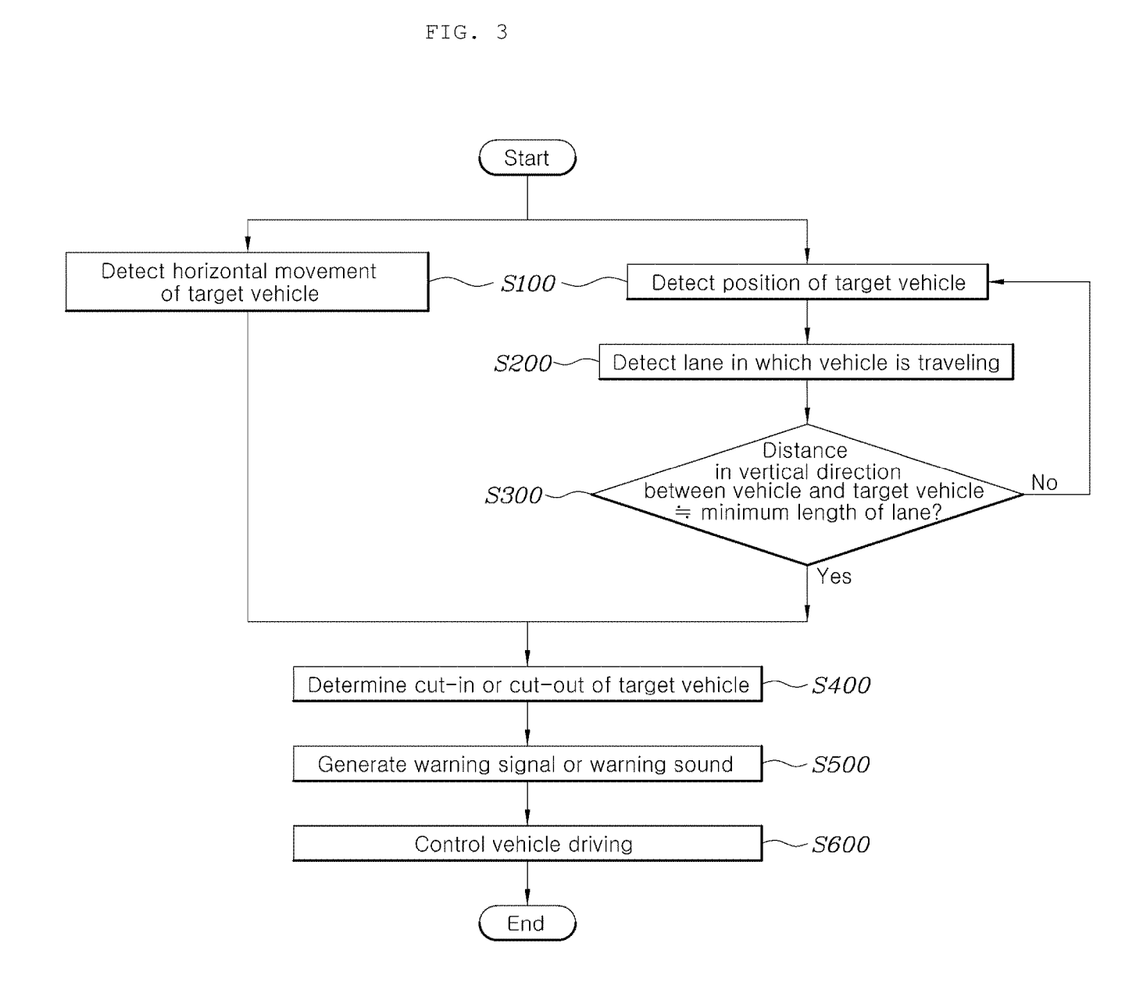
FIG. 3 is a flowchart of a vehicle control method according to an embodiment of the present invention.

A method for controlling the vehicle 100 according to the present invention may include a vehicle detection step S100 of detecting the target vehicle 200 and calculating position information and movement information on the target vehicle 200, a lane detection step S200 of recognizing a lane in which the vehicle 100 is traveling and calculating lane information on the lane, and a determination step S300 of determining cut-in or cut-out of the target vehicle 200 with respect to the lane on the basis of relative movement of the vehicle 100 and the target vehicle 200 in the horizontal direction or change in the length of the recognized lane.

The method may further include a similarity determination step S300 of determining a similarity between a distance L2 in the vertical direction between the vehicle 100 and the target vehicle 200 detected in the vehicle detection step S100 and a minimum length L1 of the lane detected in the lane detection step S200, and in the determination step S400, cut-in or cut-out of the target vehicle 200 may be determined by comparing a maximum length and the minimum length of the lane upon determination that the distance L2 in the vertical direction between the vehicle 100 and the target vehicle 200 is similar to the minimum length L1 of the lane in the similarity determination step S300.

In the determination step S400, cut-in or cut-out of the target vehicle 200 may be determined on the basis of a position and a speed of the target vehicle 200 in the horizontal direction, detected in the vehicle detection step S100.

The method may further include a warning generation step S500 of generating a warning signal or warning sound upon determination of cut-in or cut-out of the target vehicle 200 in the determination step S400.

The method may further include a control step S600 of controlling driving of the vehicle 100 on the basis of the position information and the movement information on the target vehicle 200 detected in the vehicle detection step S100 upon determination of cut-in or cut-out of the target vehicle 200 in the determination step S400.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The vehicle driving control system according to the present invention can correctly determine cut-in or cut-out of a neighboring vehicle through a plurality of factors by determining cut-in or cut-out of the neighboring vehicle on the basis of relative positions of the neighboring vehicle and a host vehicle detected by the vehicle detector and lane information detected by the lane detector and determining cut-in or cut-out of the neighboring vehicle on the basis of position information and movement information on the neighboring vehicle detected by the vehicle detector.

Furthermore, the vehicle driving control system can control driving of the host vehicle on the basis of the position of the neighboring vehicle upon determination of cut-in or cut-out of the neighboring vehicle and thus can control driving of the host vehicle in accordance with traffic.

The units, modules, and components that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

What is claimed is:

1. A vehicle driving control system comprising:
    a vehicle detector configured to:
        detect a target vehicle; and
        calculate position information and movement information of the target vehicle;
    a lane detector configured to:
        recognize a lane in which a subject vehicle is traveling; and
        calculate lane information of the lane relative to the subject vehicle; and
    a processor configured to:
        determine a cut-in or a cut-out of the target vehicle based on relative movement between the subject vehicle and the target vehicle in a horizontal direction as calculated by the vehicle detector or a change in a length between the subject vehicle and the target vehicle in the recognized lane as calculated by the lane detector;
        determine the cut-in or the cut-out of the target vehicle by comparing a maximum length and a minimum length of the lane in which the subject vehicle is traveling detected by the lane detector; and
        determine a similarity between a distance in a vertical direction between the subject vehicle and the target vehicle detected by the vehicle detector and the minimum length of the lane detected by the lane detector,
    wherein the processor is further configured to calculate a difference between the maximum length and the minimum length of the lane in which the subject vehicle is traveling detected by the lane detector in response that when the target vehicle moves into the lane in which the subject vehicle is traveling, the lane detector detects that the lengths of both sides of the lane in which the subject vehicle is traveling are different from each other because the lane is covered by the target vehicle and to determine the cut-in or the cut-out of the target vehicle in response to the calculated difference being determined to exceed a predetermined value.

2. The vehicle driving control system according to claim 1, wherein the vehicle detector is connected to a camera sensor or a radar sensor disposed in the subject vehicle and configured to calculate the movement information on the target vehicle in the horizontal direction.

3. The vehicle driving control system according to claim 1, wherein the processor is further configured to determine the similarity between the distance in the vertical direction between the subject vehicle and the target vehicle and the minimum length of the lane by comparing a tuning value, obtained by dividing a difference between the distance in the vertical direction between the subject vehicle and the target vehicle and the minimum length of the lane by a larger value between the distance in the vertical direction between the subject vehicle and the target vehicle and the minimum length of the lane, with a predetermined value.

4. The vehicle driving control system according to claim 1, wherein the lane detector is connected to a camera sensor disposed in the subject vehicle and configured to detect the lane in which the subject vehicle is traveling.

5. The vehicle driving control system according to claim 1, wherein the processor is further configured to determine the cut-in or the cut-out of the target vehicle based on a position and a speed of the subject target vehicle in the horizontal direction detected by the vehicle detector.

6. The vehicle driving control system according to claim 1, further comprising:
    a warning generator configured to generate a warning signal or a warning sound upon determination of cut-in or cut-out of the target vehicle by the determiner.

7. The vehicle driving control system according to claim 1, further comprising:
    a controller configured to control driving of the subject vehicle based on the position information and the movement information on the target vehicle detected by the vehicle detector upon determination of cut-in or cut-out of the target vehicle by the determiner.

8. A vehicle driving control method comprising:
    detecting, by a vehicle detector, a target vehicle;
    calculating, by the vehicle detector, position information and movement information of the target vehicle;
    recognizing, by a lane detector, a lane in which a subject vehicle is traveling;
    calculating, by the lane detector, lane information of the lane relative to the subject vehicle;
    determining a cut-in or a cut-out of the target vehicle based on relative movement of the subject vehicle and the target vehicle in a horizontal direction as calculated by the vehicle detector or a change in a length between the subject vehicle and the target vehicle in the recognized lane as calculated by the lane detector;
    determining the cut-in or the cut-out of the target vehicle by comparing a maximum length and a minimum length of the lane in which the subject vehicle is traveling detected by the lane detector;
    determining a similarity between a distance in a vertical direction between the subject vehicle and the target vehicle and the minimum length of the lane in which the subject vehicle is traveling; and
    calculating a difference between the maximum length and the minimum length of the lane in which the subject vehicle is traveling detected by the lane detector in response that when the target vehicle moves into the lane in which the subject vehicle is traveling, the lane detector detects that the lengths of both sides of the lane in which the subject vehicle is traveling are different from each other because the lane is covered by the target vehicle, and determining the cut-in or the cut-out of the target vehicle, in response to the calculated difference being determined to exceed a predetermined value.

9. The vehicle driving control method according to claim 8, wherein the determining of the cut-in or the cut-out of the target vehicle is based on a position and a speed of the target vehicle in the horizontal direction.

10. The vehicle driving control method according to claim 8, further comprising:
    generating a warning signal or warning sound upon determination of the cut-in or the cut-out of the target vehicle.

11. The vehicle driving control method according to claim 8, further comprising:
  controlling driving of the subject vehicle based on the position information and the movement information on the target vehicle upon determination of the cut-in or the cut-out of the target vehicle.

12. The vehicle driving control method according to claim 8,
  wherein the cut-in of the target vehicle corresponds to movement of the target vehicle to a front of the subject vehicle, and
  wherein the cut-out of the target vehicle corresponds to movement of the target vehicle from the front of the subject vehicle to a side of the subject vehicle.

13. The vehicle driving control system according to claim 1,
  wherein the cut-in of the target vehicle corresponds to movement of the target vehicle to a front of the subject vehicle, and
  wherein the cut-out of the target vehicle corresponds to movement of the target vehicle from the front of the subject vehicle to a side of the subject vehicle.

* * * * *